US012689796B2

(12) United States Patent
Lopez Coya

(10) Patent No.: US 12,689,796 B2
(45) Date of Patent: Jul. 21, 2026

(54) METHOD, VIRTUAL REALITY DEVICE, SYSTEM AND COMPUTER PROGRAM FOR PARENTAL CONTROL DETECTION IN A 3D VIRTUAL ENVIRONMENT

(71) Applicant: Telefónica Innovación Digital, S.L., Madrid (ES)

(72) Inventor: Pablo Ignacio Lopez Coya, Madrid (ES)

(73) Assignee: Telefónica Innovación Digital, S.L., Madrid (ES)

( * ) Notice: Subject to any disclaimer, the term of this patent is extended or adjusted under 35 U.S.C. 154(b) by 0 days.

(21) Appl. No.: 18/962,255

(22) Filed: Nov. 27, 2024

(65) Prior Publication Data

US 2025/0211823 A1     Jun. 26, 2025

(30) Foreign Application Priority Data

Dec. 22, 2023     (EP) .................................... 23383370

(51) Int. Cl.
*H04N 21/44*          (2011.01)
*H04N 21/442*        (2011.01)
(52) U.S. Cl.
CPC ..... *H04N 21/44008* (2013.01); *H04N 21/442* (2013.01)
(58) Field of Classification Search
None
See application file for complete search history.

(56) References Cited

U.S. PATENT DOCUMENTS

2016/0300388 A1     10/2016    Stafford et al.
2021/0064774 A1     3/2021    Collart

OTHER PUBLICATIONS

European Search Report for EP 23 38 3370.6 dated May 6, 2024.

*Primary Examiner* — James R Marandi
(74) *Attorney, Agent, or Firm* — Sughrue Mion, PLLC

(57)          ABSTRACT

A computer implemented method, virtual reality device, system, and computer programs for parental control detection in 3D virtual environments. The method includes obtaining, by a virtual reality device of a user, a 3D video projection of a scene occurring in a 3D multiuser virtual environment; processing the 3D video projection as 2D frames using a parental control algorithm; and determining that the 3D video projection contains or refers to inappropriate digital content based on a result of the processing. The parental control algorithm uses additional data of the 3D multiuser virtual environment to improve capacity detection of the inappropriate digital content, for instance, location information and/or temporal information of previously detected inappropriate 3D content; audiovisual information received from different concurrent space-time 3D users involved in the same scene; and/or audiovisual and location real-time information of the 3D multiuser virtual environment.

14 Claims, 4 Drawing Sheets

METHOD, VIRTUAL REALITY DEVICE, SYSTEM AND COMPUTER PROGRAM FOR PARENTAL CONTROL DETECTION IN A 3D VIRTUAL ENVIRONMENT

TECHNICAL FIELD

The present invention generally relates to parental control techniques. More specifically, the invention relates to a computer implemented method, virtual reality device, system, and computer programs for parental control detection in 3D virtual environments.

BACKGROUND OF THE INVENTION

The field of parental control has witnessed substantial advancements, particularly in solutions employing image and video processing technologies. Parental control tools aim to help parents manage and monitor their children's digital activities, ensuring a safe and appropriate online experience.

In recent years, advancements in image and video processing have led to the development of more sophisticated parental control solutions. These technologies utilize machine learning algorithms to analyze images and videos in real-time, allowing for the identification of potentially harmful or explicit content. The algorithms can recognize nudity, violence, drug-related imagery, or other inappropriate visuals, enabling timely alerts or content blocking.

Additionally, machine learning algorithms can categorize content based on age-appropriateness, helping parents set appropriate access levels for their children. These algorithms continuously learn and adapt to new content, improving the accuracy and effectiveness of the parental control system over time.

Furthermore, there's a growing focus on natural language processing (NLP) for analyzing text-based content in online platforms and applications. NLP algorithms can detect cyberbullying, hate speech, or other harmful language, providing parents with insights into their children's interactions and online communication.

Integration of artificial intelligence (AI) and deep learning techniques is another trend. AI-powered parental control systems can create personalized profiles for each child, tailoring restrictions and permissions based on individual needs and age groups. These systems can also generate comprehensive reports for parents, offering insights into their children's online behavior and trends.

However, it's important to note that while these technological advancements are promising, they are not without challenges. Privacy concerns, algorithm accuracy, and the ever-evolving nature of digital content present ongoing issues that need to be addressed to ensure effective and ethical use of parental control solutions.

In conclusion, image and video processing technologies, alongside advancements in machine learning and AI, are shaping the state of the art in parental control solutions.

These innovations offer more sophisticated and customizable approaches to help parents protect and guide their children's online experiences. Ongoing research and development in this field will likely bring further enhancements and refinements to address emerging challenges and make parental control tools even more effective [1-3].

In particular, several state-of-the-art deep learning algorithms have been utilized in image and video processing for parental control detection [4-11]. These algorithms are crucial in automatically analyzing and categorizing visual content to ensure a safe online environment for children.

Previous solutions are based on the processing of 2D frames from images or video streaming to infer inadequate content for children. When it comes to an immersive experience based on 3D objects, such as the Metaverse, techniques based on 2D frames obtain limited results.

REFERENCES

[1] Park, N., & Lee, S. (2018). An intelligent pornographic image detection system using deep learning. Multimedia Tools and Applications, 77 (1), 387-406.

[2] Diwanji, D., Singh, A., & Jain, D. (2019). Cyber Bullying Detection on Social Media Using Deep Learning Techniques. In 2019 3rd International Conference on Trends in Electronics and Informatics (ICOEI) (pp. 631-636). IEEE.

[3] Sengar, M., Ahirwar, P., & Gupta, B. (2020). An efficient framework for cyberbullying detection in social media. In 2020 International Conference on Computer Science, Engineering and Applications (ICCSEA) (pp. I-6). IEEE.

[4] Szegedy, C., Liu, W., Jia, Y., Sermanet, P., Reed, S., Anguelov, D., . . . & Rabinovich, A. (2015). Going deeper with convolutions. In Proceedings of the IEEE conference on computer vision and pattern recognition (CVPR) (pp. 1-9).

[5] He, K., Zhang, X., Ren, S., & Sun, J. (2016). Deep residual learning for image recognition. In Proceedings of the IEEE conference on computer vision and pattern recognition (CVPR) (pp. 770-778).

[6] Simonyan, K., & Zisserman, A. (2014). Very deep convolutional networks for large-scale image recognition. arXiv preprint arXiv: 1409.1556.

[7] Sandler, M., Howard, A., Zhu, M., Zhmoginov, A., & Chen, L. C. (2018). MobileNetV2: Inverted residuals and linear bottlenecks. In Proceedings of the IEEE conference on computer vision and pattern recognition (CVPR) (pp. 4510-4520).

[8] Redmon, J., & Farhadi, A. (2018). YOLOv3: An incremental improvement. arXiv preprint arXiv: 1804.02767.

[9] Ren, S., He, K., Girshick, R., & Sun, J. (2017). Faster R-CNN: Towards real-time object detection with region proposal networks. IEEE transactions on pattern analysis and machine intelligence, 39 (6), 1137-1149.

[10] Chung, J. S., & Zisserman, A. (2016). Lip reading in the wild. In Asian conference on computer vision (pp. 87-103).

[11] Carreira, J., & Zisserman, A. (2017). Quo vadis, action recognition? A new model and the kinetics dataset. In proceedings of the IEEE conference on computer vision and pattern recognition (CVPR) (pp. 4724-4733).

DESCRIPTION OF THE INVENTION

The object of present invention is thus to provide a new mechanism to boost the performance of traditional techniques applied to detect unsuitable digital content in parental control applications. In particular, present invention introduces three kinds of genuine data sources only available in 3D virtual environments/worlds, such as the Metaverse, that either individually or properly combined in a multi-modal approach with audiovisual AI based models offers improved results in terms of accuracy over state-of-the-art solutions.

To that end, the present invention proposes, according to one aspect, a method for parental control detection in a 3D multiuser virtual environment. The method comprises, as known in the field, obtaining, by a virtual reality device of a given user, a 3D video projection of a scene occurring in a 3D multiuser virtual environment; processing, by the virtual reality device, the 3D video projection as 2D frames using a parental control algorithm; and determining, by the virtual reality device, that the 3D video projection contains or refers to inappropriate digital content based on a result of said processing.

Different to the known proposals in the field, in the proposed method, the parental control algorithm comprises using additional data of the 3D multiuser virtual environment to improve capacity detection of the inappropriate digital content.

The present invention also provides, according to a second aspect, a virtual reality device for parental control detection in a 3D multiuser virtual environment. The virtual reality device comprises at least one memory and one or more processors configured to obtain a 3D video projection of a scene occurring in a 3D multiuser virtual environment; process the 3D video projection as 2D frames using a parental control algorithm; and determine that the 3D video projection contains or refers to inappropriate digital content based on a result of the processing. The parental control algorithm comprises using additional data of the 3D multiuser virtual environment to improve capacity detection of the inappropriate digital content.

The present invention also provides, according to a third aspect, a system for parental control detection in a 3D multiuser virtual environment. The system comprises at least one virtual reality device with at least one memory and one or more processors configured to obtain a 3D video projection of a scene occurring in a 3D multiuser virtual environment; process the 3D video projection as 2D frames using a parental control algorithm; and determine that the 3D video projection contains or refers to inappropriate digital content based on a result of the processing. The parental control algorithm comprises using additional data of the 3D multiuser virtual environment to improve capacity detection of the inappropriate digital content Particularly, according to the present invention, the additional data comprises one or more of: i) location information and/or temporal information of previously detected inappropriate 3D content; ii) audiovisual information received from different concurrent space-time 3D users involved in the same scene; iii) audiovisual and location real-time information of the 3D multiuser virtual environment.

In some embodiments, the location information is stored in a database (which can be part of the proposed system) as one or more location registers, each location register referring to a location where a previously detected inappropriate 3D content occurred.

In some embodiments, the location is identified using the 3D cartesian coordinates where the previously inappropriate 3D content occurred.

In some embodiments, the parental control algorithm comprises considering a distance between at least one location register and a point at which the 3D video projection is occurring. For example, the distance can comprise the Euclidean distance.

In some embodiments, the temporal information is stored in a database as one or more time registers, each time register comprising a time stamp referring to a time where a previously detected inappropriate 3D content occurred.

In some embodiments, the parental control algorithm comprises considering whether an arithmetic difference between the time stamp of at least one time register and a time stamp of a current time at which the 3D video projection is occurring is smaller or not than a pre-configured time window where the 3D video projection is occurring.

In some embodiments, the audiovisual information received from the different concurrent space-time 3D users comprises audiovisual information from different angles of the scene.

In some embodiments, the audiovisual and location real-time information of the 3D multiuser virtual environment is acquired by dynamic probes deployed within the 3D multiuser virtual environment.

In some embodiments, the 3D video projection is obtained in real time.

In some embodiments, the system comprises additional virtual reality devices, each belonging to one of the concurrent space-time 3D users.

Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF THE INVENTION AND OF PREFERRED EMBODIMENTS

Present invention provides a new solution to overcome the state of the art in parental control detection algorithms for 3D immersive experiences, such as the Metaverse. By leveraging tridimensional properties of immersive environments/worlds, new techniques based on multi-camera perspective, and/or dynamic location and/or historical events records have been found suitable candidates to increase the detection capacity for parental control scenarios.

The present invention can incorporate a computing engine that is either supplied with or utilizes one or more data sources (i.e. additional data/information), derived from the unique context of 3D immersive experiences. This integration aims to enhance the state-of-the-art (SOTA) detection mechanisms employed in traditional parental control systems. More specifically, the computing engine is capable of leveraging or assimilating the following types of additional data: location information and/or temporal information of previously detected inappropriate 3D content; audiovisual information received from different space-time 3D users involved in the same scene; audiovisual and location real-time information of the 3D multiuser virtual environment.

Note that these distinct pieces of data can be utilized independently or in combination to reinforce the effectiveness of the invention.

In the following, different embodiments where the above additional data is used are detailed.

Historical Location and/or Temporal Information:

In this case, once a violent situation or any other kind of parental control related content has been witnessed in a specific location by a virtual user, the corresponding 3D coordinates of the event location get recorded and time stamped. Typically, the user will report the issue providing the above data as additional evidence for future detections on that specific location. This way successive parental control operations requested for a short time-space range may benefit from these historical reports.

Adding historical location reports to real-time Artificial Intelligence (AI)-vision based scene identification mechanisms increases the probabilities of a successful detection; therefore increasing parental control efficiency.

Figure 1:
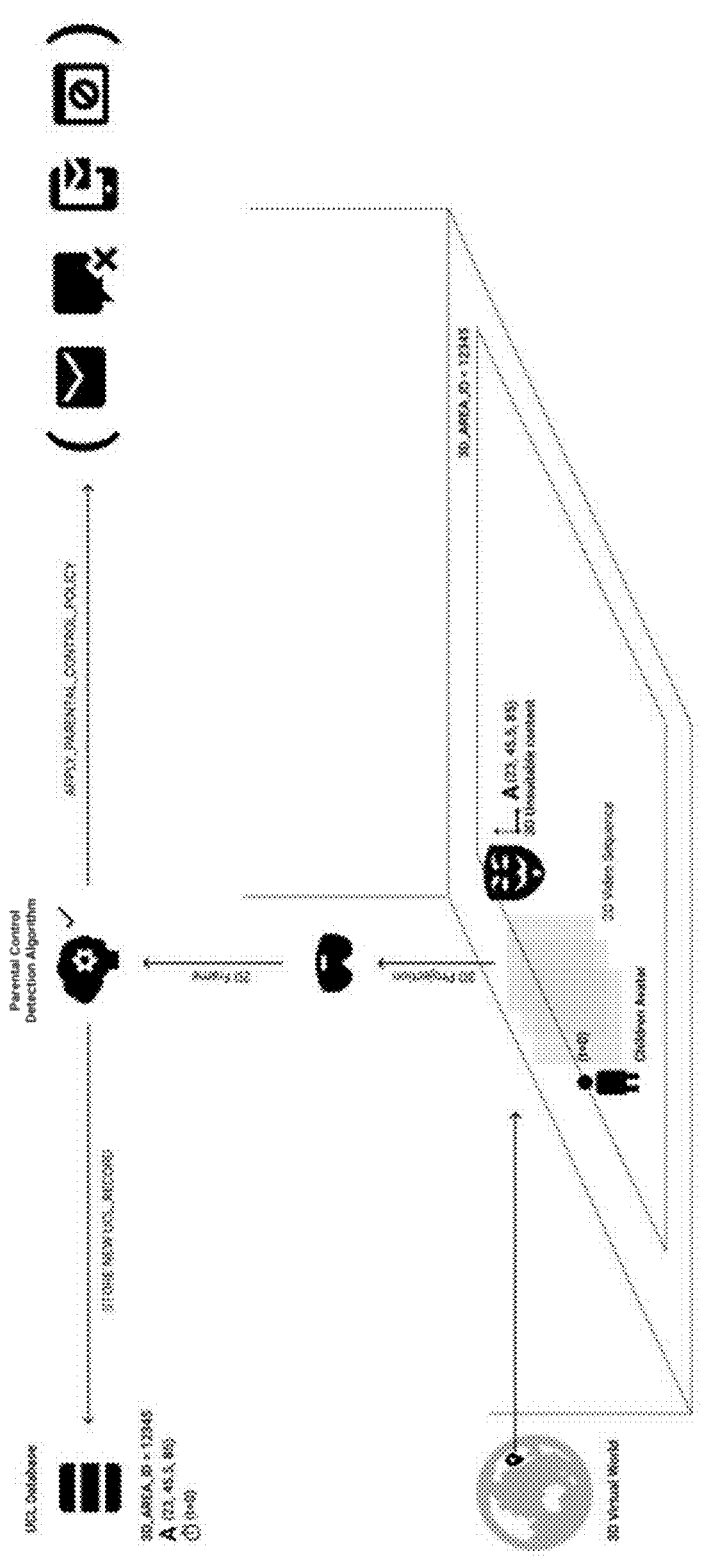
FIG. 1 schematically illustrates a 3D inappropriate/unsuitable content registration.

FIG. 1 shows how an avatar controlled by a children is exposed to an inappropriate scene in terms of parental control. The 3D unsuitable content is located at point A with the corresponding 3D cartesian coordinates. According to video analysis techniques based on AI, a 2D video stream from a 3D projection is processed by a virtual reality device, such as a virtual reality glasses as depicted in the figure, and the corresponding 2D frame sequence delivered to the parental control algorithm. Once the parental control algorithm has marked the 3D scene as "Inappropriate/Unsuitable Content", a new Unsuitable Content Location (UCL) record is generated by sending the following information to a database (UCL database as referred in the figure):

Area_ID: which is the portion of the location inside the virtual environment susceptible to apply an immersive parental control service;

Scene_Location: the set of cartesian coordinates inside the Area_ID where the unsuitable scene takes place;

Time_Stamp: a time mark to register when the unsuitable scene happened.

Figure 2:
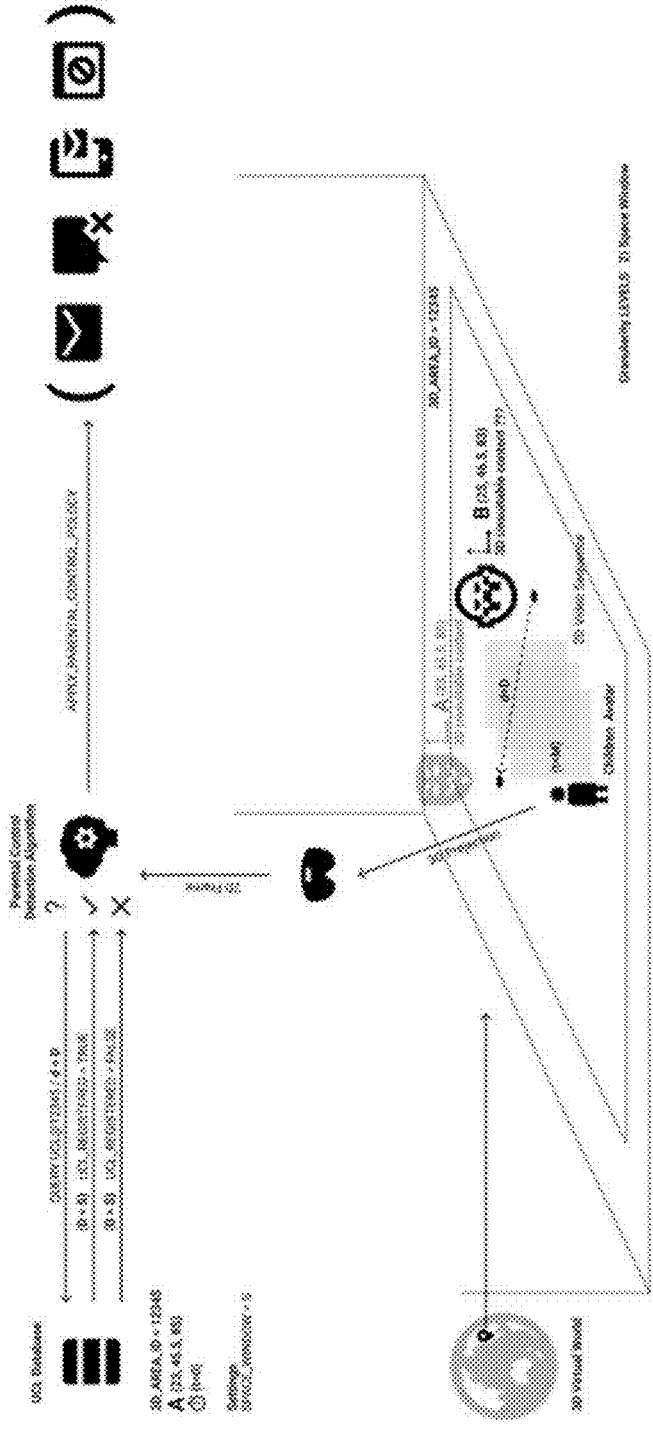
FIG. 2 schematically illustrates an unsuitable content detection based on 3D space proximity.

The database can operate as an independent register for space-time metadata of unsuitable events happening inside a specific virtual environment. This register feeds the parental control algorithm for subsequent events detection. FIG. 2 shows how the parental control algorithm finds its detection capacity improved by querying the database for unsuitable content space proximity. Thus, for a certain Area_ID, a pre-configured space window size and a given UCL classification query (point B in the figure), the database can: work the distance (D), e.g. the Euclidean distance, between previous UCL registers and point B; identify all previous UCL registers under the perimeter of a circumference with radius(S) that equals to the pre-configured space window size; and return TRUE if D is smaller than S, which means that a previous UCL was registered very near from the current event, so in the requested location B is likely to be a new potential case of unsuitable content, or return FALSE if D is greater than S, which means that no previous UCL was registered, so there is not further information to support that potential unsuitable content may have occurred in the requested location B.

Figure 3:
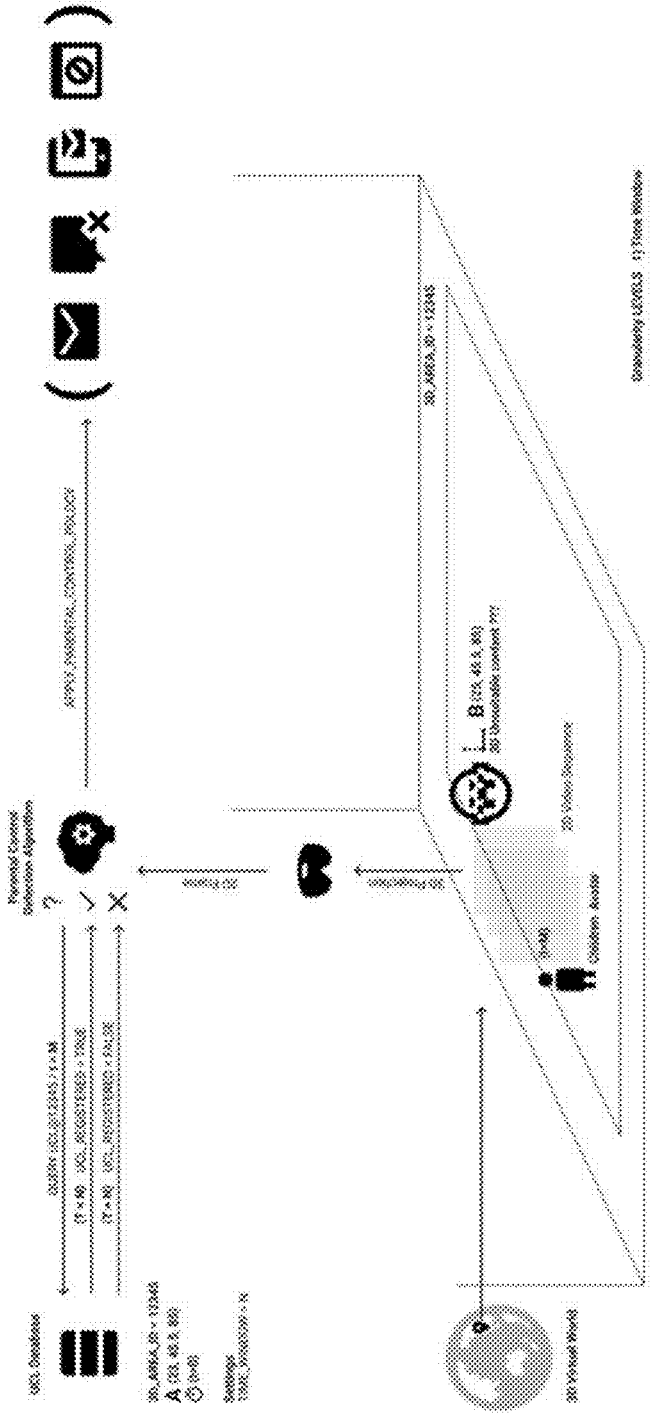
FIG. 3 schematically illustrates an unsuitable content detection based on time proximity.

FIG. 3 shows another parental control algorithm improvement in terms of detection accuracy. In this embodiment, however, the query is based on temporal proximity. Following a similar approach, for a certain Area_ID, the following fields can be provided as data input: a pre-configured time window size (N) and a given UCL classification query (point B in the figure). For this scenario, the key parameter is a time stamp (t=M as shown in the figures) in which the current scene under analysis occurs (i.e. point B). In this case, a database, which can be the same database as in the previous embodiment, can: work the Arithmetic Difference (T) between the time stamp of previous UCL registers in Area_ID and the current time (t=M); identify all previous UCL registers that fall inside the pre-configured time window size (N); and return TRUE if T is smaller than N, which means that a previous UCL was recently registered very near in time from the current event, so in the requested location B is likely to exist a new potential case of unsuitable content, or return FALSE if T is smaller than N, which means that no previous UCL was registered near in time from the actual event, so there is no further argument to support that potential unsuitable content may have occurred in the requested location B.

The above-described embodiments are completely complementary and can happen at the same time.

Furthermore, in a real scenario both time and space dimensions are enabled so the parental control algorithm may benefit simultaneously from them. The database can find the previous registers that meets both T<N and D<S conditions, and can determine the highest probability to characterize the current scene as unsuitable content. Other results for the current scene such as meeting the space condition (D<S) and but not the time condition (T<N), and vice versa, may suggest certain level of suspicious activity but definitely not a high probability of unsuitable content.

Concurrent Space-Time 3D Users

Multi-user interaction is a key factor for massive adoption of immersive experiences. As the Metaverse expands, it is more likely for users to witness the same kind of immersive scenes. The present invention leverages this situation to improve the accuracy of traditional parental control detection approaches. In essence, each user witnessing the same event may be seen as a camera processing the scene from different angles. Each new angle can be considered as a new stream of data describing the same phenomena that reinforces the overall detection capacity.

Figure 4:
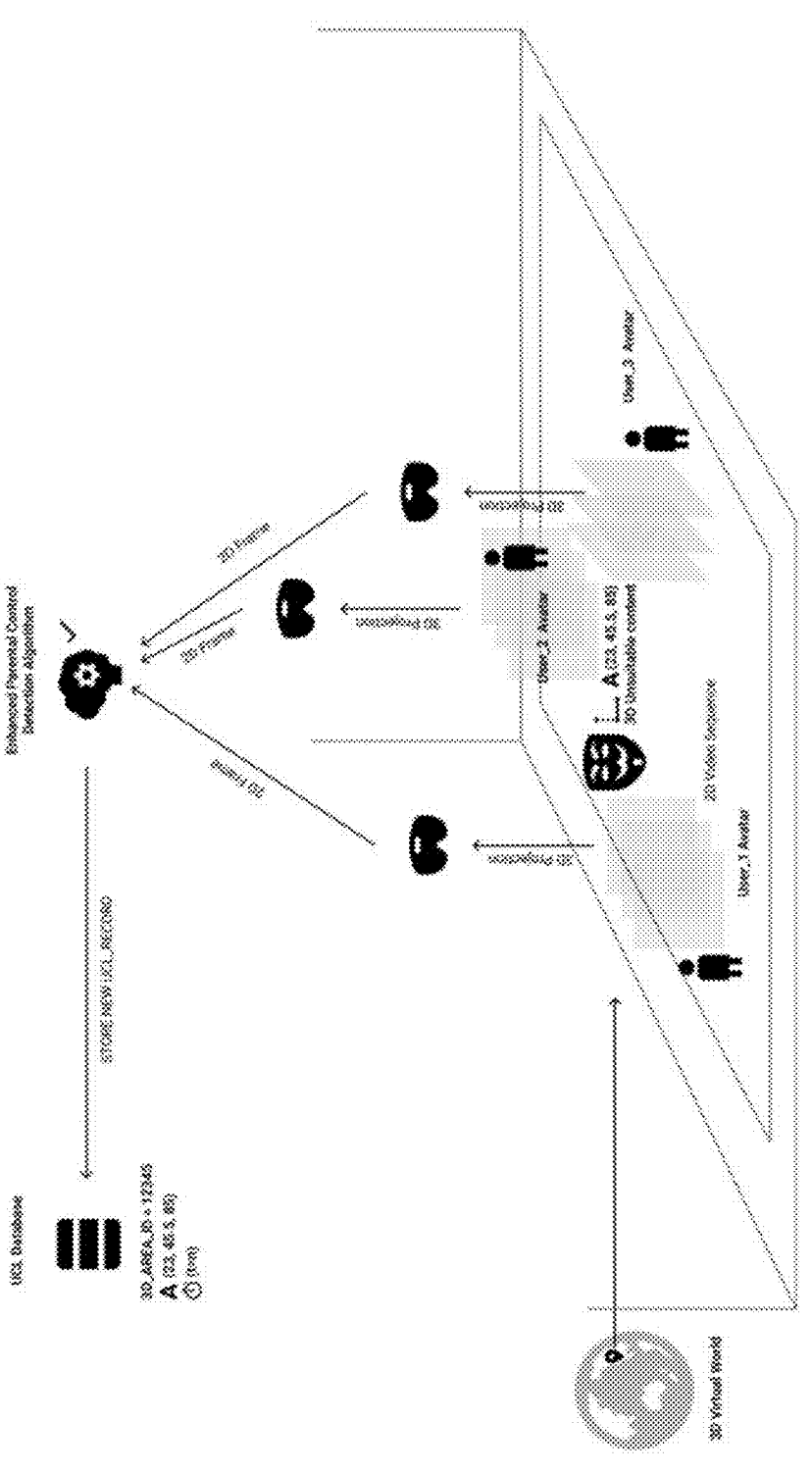
FIG. 4 schematically illustrates the PCA detection benefits from concurrent 3D users.

Concurrent space-time 3D users involved in the same scene/event may contribute positively to parental control detection by simultaneously combining the results of the corresponding AI-vision detection mechanisms. Two 3D users are considered to be involved in the same scene if the distance (e.g. a Euclidean distance) between them in the 3D multiuser virtual environment is smaller than a predetermined threshold, and their corresponding 2D video streams resulting from their 3D projections correspond to an at least partially overlapping area of the 3D multiuser virtual environment. FIG. 4 illustrates how different perspectives of the event taken from different 3D concurrent space-time users contribute to improve the parental control algorithm detection capacity. The main reason to add multiple cameras is that AI video detection algorithms gather more information about the same scene which may improve the chances of the AI model to classify more accurately the objects that compose the scene and, therefore, to tag more precisely whether the event is considered a potential case of unsuitable content.

Audiovisual and Location Real-Time Information of the 3D Multiuser Virtual Environment Like spacecraft exploration, 3D world static or even dynamic probes can be deployed around the immersive environment (or at least around the places more likely to produce a non-suitable event or scene in terms of parental control). Each probe can work as a dynamic camera strategically positioned for continually collecting audiovisual and location real-time information of the 3D virtual environment. The resulting data can feed a historical location record on what locations are more suitable and compliance with parental control policies.

Running parental control detection continually inside 3D virtual environments creates a new method for gathering relevant information beforehand to help increase accuracy for traditional AI-vision detection mechanisms.

In some embodiments, the computing engine is the one disclosed in WO2023062250A1 "Method and system for taking decisions and executing unattended actions in a limited environment". That is, it is based on a layered information association model that generates and associates insights extracted from different sources of data relevant to the understanding of events that a user experiences in a 3D immersive environment. The result is a dynamic context that allows the computing engine itself to make coherent decisions and evaluate the type of scene in terms of parental control. Each level can provide more refined information to the higher level:

Layer 1 (Data Generation): This first layer is made up of all the computing devices belonging to the immersive environment where event discovery is to be performed. Each computing device generates a series of data sources, referred as FD_i. Each data source is classified by the nature of the sensitive element that collects the data. Typically this can involve audio, video or even telemetry sources related to a temperature, pressure or humidity sensor. However, other more sophisticated data sources, such as the position of a mobile terminal, or the avatar coordinates from an immersive experience could also be involved.

Layer 2 (Pattern Recognition): In this second layer, with the aim of adapting the raw data from all the previously mentioned contribution sources, preprocessing modules appear. Each preprocessing module accommodates one or more FD_i to a given recognition technique. All of these recognition techniques have the mission of identifying different types of recognition patterns using specific machine learning algorithms depending on the nature of the data source. Obviously, several FD_i can contribute to feeding one or several recognition techniques. The result is an inference element with information relevant to the next level.

Layer 3 (Information Association): This third layer, in essence, is made up of different information association modules. Each of these modules uses specific information association techniques to relate elements inferred by lower levels. In this aspect, the association criterion followed in each module is directed along a certain line depending on the nature of the discovery process that is intended to be addressed. The final result is the generation of an insight relevant to the detection of a specific event in the environment. In other words, an insight is the minimum unit of understandable information discovered in the action environment, and therefore, the bricks on which relevant use cases for a given task will be built.

Table 1 shows some examples of machine learning strategies and their scope of application within the layer model described above, as well as the data source or sources that would contribute to generating a discovery base.

TABLE 1

| Examples of ML techniques and their scope of application in the layer model | | | |
|---|---|---|---|
| ML Field | Data Source/s | SOTA Technique | Context |
| Face Detection | Video | HAAR cascade/SSD | Layer 2 |
| Gender Classification | Audio/Video | Efficient Net | Layer 2 |

TABLE 1-continued

| Examples of ML techniques and their scope of application in the layer model | | | |
|---|---|---|---|
| ML Field | Data Source/s | SOTA Technique | Context |
| Human Pose Estimation | Video | AlphaPose | Layer 2/3 |
| Logo Detection | Video | Yolov5 | Layer 2 |
| Motion Detection | Audio/Video/Wi-Fi | Frame Difference | Layer 2 |
| Object Detection | Video | Yolov5/Fastercnn/ssd | Layer 2 |
| Object Tracking | Video | Deep Sort | Layer 2/3 |
| Scene Classification | Audio/Video | Efficient Net | Layer 2/3 |
| Human Activity Recognition | Audio/Video | Efficient Net | Layer 2/3 |

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

The present disclosure and/or some other examples have been described in the above. According to descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

The scope of the present invention is defined in the following set of claims.

The invention claimed is:

1. A method for parental control detection in a 3D multiuser virtual environment, the method comprising:

obtaining, by a virtual reality device of a given user, a 3D video projection of a scene occurring in a 3D multiuser virtual environment;

processing, by the virtual reality device, the 3D video projection as 2D frames using a parental control algorithm; and determining, by the virtual reality device, that the 3D video projection contains or refers to inappropriate digital content based on a result of said processing, characterized in that the parental control algorithm comprises using additional data of the 3D multiuser virtual environment to improve capacity detection of the inappropriate digital content, the additional data comprising:

location information of previously detected inappropriate 3D content, the location information being stored in a database as one or more location registers, each location register referring to a location where a previously detected inappropriate 3D content occurred;

audiovisual information received from different concurrent space-time 3D users involved in the same scene;

audiovisual and location real-time information of the 3D multiuser virtual environment.

2. The method of claim 1, wherein the location is identified using the 3D cartesian coordinates where the previously inappropriate 3D content occurred.

3. The method of claim 2, wherein the parental control algorithm comprises considering a distance between at least one location register and a point at which the 3D video projection is occurring, said distance comprising a Euclidean distance.

4. The method of claim 1, wherein the additional data further comprises temporal information of previously detected inappropriate 3D content, and the temporal information is stored in a database as one or more time registers, each time register comprising a time stamp referring to a time when the previously detected inappropriate 3D content occurred.

5. The method of claim 4, wherein the parental control algorithm comprises considering whether an arithmetic difference between the time stamp of at least one time register and a time stamp of a current time at which the 3D video projection is occurring is smaller or not than a pre-configured time window where the 3D video projection is occurring.

6. The method of claim 1, wherein the audiovisual information received from the different concurrent space-time 3D users comprising audiovisual information from different angles of the scene.

7. The method of claim 1, wherein the audiovisual and location real-time information of the 3D multiuser virtual environment being acquired by dynamic probes deployed within the 3D multiuser virtual environment.

8. The method of claim 1, wherein the 3D video projection is obtained in real time.

9. A non-transitory computer readable medium comprising code instructions that when executed by at least one processor of a computing device implement the method of claim 1.

10. A virtual reality device for parental control detection in a 3D multiuser virtual environment, comprising at least one memory, and one or more processors configured to:

obtain a 3D video projection of a scene occurring in a 3D multiuser virtual environment;

process the 3D video projection as 2D frames using a parental control algorithm; and determine that the 3D video projection contains or refers to inappropriate digital content based on a result of the processing, characterized in that the parental control algorithm comprises using additional data of the 3D multiuser virtual environment to improve capacity detection of the inappropriate digital content, the additional data comprising:

location information of previously detected inappropriate 3D content, the location information being stored in a database as one or more location registers, each location register referring to a location where a previously detected inappropriate 3D content occurred;

audiovisual information received from different concurrent space-time 3D users involved in the same scene; and audiovisual and location real-time information of the 3D multiuser virtual environment.

11. The system of claim 10, comprising one or more dynamic probes deployed within the 3D multiuser virtual environment to acquire the audiovisual and location real-time information of the 3D multiuser virtual environment.

12. A system for parental control detection in a 3D multiuser virtual environment, the system comprising at least one virtual reality device with at least one memory and one or more processors configured to:

obtain a 3D video projection of a scene occurring in a 3D multiuser virtual environment; process the 3D video projection as 2D frames using a parental control algorithm; and determine that the 3D video projection contains or refers to inappropriate digital content based on a result of the processing, characterized in that the parental control algorithm comprises using additional data of the 3D multiuser virtual environment to improve capacity detection of the inappropriate digital content, the additional data comprising:

location information of previously detected inappropriate 3D content, the location information being stored in a database as one or more location registers, each location register referring to a location where a previously detected inappropriate 3D content occurred;

audiovisual information received from different concurrent space-time 3D users involved in the same scene; and audiovisual and location real-time information of the 3D multiuser virtual environment.

13. The system of claim 12, wherein the additional data further comprises temporal information of previously detected inappropriate 3D content, and the temporal information is stored as one or more time registers, each time register comprising a time stamp referring to a time when the previously detected inappropriate 3D content occurred.

14. The system of claim 12, comprising additional virtual reality devices each belonging to one of the concurrent space-time 3D users.

* * * * *